US012655066B2

(12) United States Patent
Mulcahy

(10) Patent No.: US 12,655,066 B2
(45) Date of Patent: Jun. 16, 2026

(54) COATING SYSTEM AND METHOD FOR MAINTENANCE THEREOF

(71) Applicant: Rolls-Royce plc, London (GB)

(72) Inventor: Thomas M. Mulcahy, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 18/440,043

(22) Filed: Feb. 13, 2024

(65) Prior Publication Data

US 2024/0286960 A1     Aug. 29, 2024

(30) Foreign Application Priority Data

Feb. 27, 2023     (GB) ...................................... 2302779

(51) Int. Cl.
| | |
|---|---|
| *F01D 5/28* | (2006.01) |
| *C04B 35/482* | (2006.01) |
| *C04B 35/486* | (2006.01) |
| *C04B 35/626* | (2006.01) |
| *C23C 28/00* | (2006.01) |

(52) U.S. Cl.
CPC .......... *C04B 35/486* (2013.01); *C04B 35/482* (2013.01); *C04B 35/62665* (2013.01); *C04B 2235/3225* (2013.01); *C04B 2235/3227* (2013.01); *C04B 2235/3246* (2013.01); *C04B 2235/72* (2013.01)

(58) Field of Classification Search
None
See application file for complete search history.

(56) References Cited

U.S. PATENT DOCUMENTS

| | | | |
|---|---|---|---|
| 5,167,721 | A | 12/1992 | McComas et al. |
| 7,479,328 | B2 | 1/2009 | Roth-Fagaraseanu et al. |
| 2003/0170119 | A1 | 9/2003 | Fried |
| 2004/0256504 | A1 | 12/2004 | Segrest et al. |

(Continued)

FOREIGN PATENT DOCUMENTS

| | | |
|---|---|---|
| CN | 114540738 A | 5/2022 |
| EP | 1491658 A1 | 12/2004 |
| EP | 2140973 B1 | 10/2012 |

OTHER PUBLICATIONS

Luo et al., Improved the Durability of Thermal Barrier Coatings with Interface Modified by Three-Dimensional Mesh Patterns, May 24, 2016 (Year: 2016).*

(Continued)

*Primary Examiner* — Mary I Omori
(74) *Attorney, Agent, or Firm* — Shumaker & Sieffert, P.A.

(57) ABSTRACT

A coating system includes a bond layer including CoNi-CrAlY; a thermal barrier layer at least partially disposed on the bond layer and including yttria stabilised zirconia; a mesh layer connecting the thermal barrier layer to the bond layer and including CoNiCrAlY; and an abradable layer disposed on the thermal barrier layer and including magnesium spinel. The mesh layer includes a plurality of cells connected to each other and is at least partially embedded in the thermal barrier layer. Each cell defines a cell opening therethrough and the cell opening of each of the plurality of cells at least partially receives the thermal barrier layer therein. The abradable layer and the thermal barrier layer are at least partially removable from the mesh layer and the bond layer without damaging them.

15 Claims, 8 Drawing Sheets

(56)       References Cited

U.S. PATENT DOCUMENTS

| | | | |
|---|---|---|---|
| 2005/0276688 A1* | 12/2005 | Roth-Fagaraseanu | ........................ C23C 28/048 415/173.4 |
| 2006/0091546 A1* | 5/2006 | Bostanjoglo | ........ C23C 28/3215 257/750 |
| 2006/0251916 A1 | 11/2006 | Arikawa et al. | |
| 2013/0177440 A1* | 7/2013 | Zhang | ................... C04B 41/009 156/280 |
| 2018/0066527 A1 | 3/2018 | Kadau et al. | |
| 2020/0256201 A1 | 8/2020 | Schaeffer et al. | |
| 2020/0370439 A1 | 11/2020 | Nelson et al. | |
| 2022/0106888 A1* | 4/2022 | Shi | ........................ C23C 28/042 |

OTHER PUBLICATIONS

European Search Report dated Jun. 5, 2024, issued in EP Patent Application No. 24154325.5.
Great Britain search report dated Aug. 15, 2023, issued in GB Patent Application No. 2302779.0.
Response to Extended Search Report dated Jun. 5, 2024, from counterpart European Application No. 24154325.5 filed Feb. 10, 2025, 50 pp.

\* cited by examiner

200

210
PLACE ARTICLE ON WATER JET DEVICE

220
CONTROL WATER JET DEVICE TO DISPENSE WATER JET THROUGH NOZZLE

230
CONTROL MOVEMENT OF ARTICLE AND NOZZLE RELATIVE TO EACH OTHER SUCH THAT ABRADABLE LAYER AND THERMAL BARRIER LAYER ARE AT LEAST PARTIALLY REMOVED FROM COATING SYSTEM AND MESH LAYER AND BOND LAYER ARE AT LEAST PARTIALLY EXPOSED

COATING SYSTEM AND METHOD FOR MAINTENANCE THEREOF

CROSS-REFERENCE TO RELATED APPLICATIONS

This specification is based upon and claims the benefit of priority from United Kingdom patent application number GB 2302779.0 filed on Feb. 27, 2023, the entire contents of which is incorporated herein by reference.

BACKGROUND

Technical Field

The present disclosure relates to a coating system for an article (e.g. a gas turbine engine component) and a method of maintaining the coating system on the article.

Description of the Related Art

An article that is exposed to severe environmental conditions, such as those including high temperatures, corrosive substances, and the like, typically includes a coating system applied over a substrate thereof for the protection of the substrate. Such severe environmental conditions may be present in high-temperature mechanical systems, such as gas turbine engines. For example, a gas turbine engine component, such as a high-pressure seal segment and a nozzle guide vane, may include a metallic substrate and a coating system to protect the metallic substrate from oxidation and hot corrosion.

One or more layers of the coating system may partially or fully wear away during use of the article, thereby rendering the article unsuitable for further use. A conventional coating system may be non-repairable. As a result, an article including the conventional coating system with worn away layers may need to be scrapped. Scrapping the article may be uneconomical. Thus, it may be desirable to repair a coating system that is worn instead of scrapping the article.

Therefore, there is a need of a coating system that is suitable for use in severe environmental conditions and can be repaired when worn, and a method of maintaining or repairing the coating system.

SUMMARY

According to a first aspect there is provided a coating system for an article. The coating system includes a bond layer disposed on the article. The bond layer includes CoNiCrAlY. The coating system further includes a thermal barrier layer at least partially disposed on the bond layer. The thermal barrier layer includes yttria stabilised zirconia. The coating system further includes a mesh layer connecting the thermal barrier layer to the bond layer. The mesh layer includes CoNiCrAlY. The mesh layer includes a plurality of cells connected to each other. The mesh layer extends from the bond layer and is at least partially embedded in the thermal barrier layer. Each cell defines a cell opening therethrough. The cell opening of each of the plurality of cells at least partially receives the thermal barrier layer therein. The coating system further includes an abradable layer disposed on the thermal barrier layer. The abradable layer includes magnesium spinel. The abradable layer and the thermal barrier layer are at least partially removable from the mesh layer and the bond layer without damaging the mesh layer and the bond layer.

The coating system of the present disclosure may protect a substrate of the article from severe environmental conditions that include, for example, high temperatures and/or corrosive substances, and allow the article to operate in the severe environmental conditions.

Moreover, the coating system may be repairable. Specifically, the abradable layer and the thermal barrier layer may be replaced with a new abradable layer and a new thermal barrier layer, respectively, to repair the coating system. As a result, the article may become fit for use after repairment and thus may be reused.

In some embodiments, the mesh layer may be a wire mesh. The wire mesh may allow the mesh layer to at least partially receive the thermal barrier layer therein.

In some embodiments, the bond layer has a thickness of from 100 microns to 400 microns.

In some embodiments, the mesh layer has a thickness of from 100 microns to 400 microns.

In some embodiments, the thermal barrier layer has a thickness of from 100 microns to 400 microns.

In some embodiments, the abradable layer has a thickness of from 300 microns to 1000 microns.

The aforementioned dimensional ranges of various layers of the coating system may improve protection provided by the coating system while facilitating at least partial removal of the abradable layer and the thermal barrier layer from the mesh layer and the bond layer without damaging the mesh layer and the bond layer.

In some embodiments, the abradable layer and the thermal barrier layer are at least partially removable from the mesh layer and the bond layer by water jet stripping. Water jet stripping may be advantageous over the use of chemicals and other conventional means, such as abrasive blasting and machining, for at least partial removal of the abradable layer and the thermal barrier layer from the mesh layer and the bond layer. Moreover, certain water stripping parameters disclosed herein may be used to improve the efficiency of water jet stripping.

In some embodiments, each of the plurality of cells includes a cell wall. The cell wall includes a first portion that is at least partially embedded within the bond layer. The first portion has a first maximum width. The cell wall further includes a second portion that extends from the first portion opposite to the bond layer. The second portion is at least partially embedded in the thermal barrier layer. The second portion has a second maximum width. The second maximum width is greater than the first maximum width.

In some embodiments, each of the first portion and the second portion has an oval cross-sectional shape.

In some embodiments, the cell wall has a minimum width between the first portion and the second portion.

The aforementioned shape and dimensional configuration of the cell wall may improve the connection between the bond layer and the thermal barrier layer.

In some embodiments, the cell opening of each of the plurality of cells further at least partially receives the bond layer therein.

Therefore, the cell opening of each of the plurality of cells at least partially receives both the bond layer and the thermal barrier layer therein, thereby improving the connection between the bond layer and the thermal barrier layer.

According to a second aspect there is provided an article. The article includes a substrate. The article further includes the coating system of the first aspect.

The substrate of the article may be protected from severe environmental conditions that include, for example, high temperatures and/or corrosive substances by the coating system. Therefore, the article may be suitable for operation in the severe environmental conditions. Advantageously, after undergoing operational wear and tear, the coating system may be repaired, and the article may be suitable for use again.

In some embodiments, the article is a gas turbine engine component.

According to a third aspect there is provided a method for maintaining the coating system of the first aspect on an article using a water jet device that includes a nozzle configured to dispense a water jet therefrom. The method includes placing the article on the water jet device, such that the coating system faces the nozzle. The method further includes controlling the water jet device to dispense the water jet through the nozzle, such that the water jet strikes the coating system. The water jet has a pressure from 276 Megapascals (MPa) to 345 MPa. The method further includes controlling a movement of the article and the nozzle relative to each other, such that the abradable layer and the thermal barrier layer of the coating system are at least partially removed from the coating system, and the mesh layer and the bond layer are at least partially exposed.

The method of the present disclosure may at least partially remove the abradable layer and the thermal barrier from the coating system using water jet stripping, such that the mesh layer and the bond layer are at least partially exposed. This may allow application of replacement abradable and thermal barrier layers to repair the coating system.

In some embodiments, controlling the movement of the article and the nozzle relative to each other comprises moving the article relative to the nozzle at a surface speed of from 13 millimetres per second (mm/s) to 70 mm/s.

In some embodiments, controlling the movement of the article and the nozzle relative to each other further comprises moving the nozzle normally to the article at a traverse speed of from 0.04 mm/s to 0.22 mm/s.

In some embodiments, the nozzle extends along a nozzle axis, and wherein an angle between the nozzle axis and the coating system is from 15 degrees to 45 degrees.

In some embodiments, the nozzle is a fan jet nozzle.

In some embodiments, wherein the nozzle has a rotational speed of 1000 rotations per minute (RPM).

In some embodiments, the nozzle has an orifice that has a width of 0.5 millimetres.

In some embodiments, a stand-off distance defined between the orifice of the nozzle and the article is from 15 mm to 25 mm.

In some embodiments, the method further includes completing two to four passes of the nozzle across the article.

The aforementioned parameters may be suitable for at least partially removing the abradable layer and the thermal barrier layer from the mesh layer and the bond layer without damaging the mesh layer and the bond layer using the water jet device.

In some embodiments, the method further includes providing a new thermal barrier layer on the exposed mesh layer and the bond layer. The method further includes providing a new abradable layer on the new thermal barrier layer.

Providing the new thermal barrier layer and the new abradable layer may effectively repair the coating system, such that the article becomes fit for use. The method may therefore allow repairment of the coating system, which may be economical as compared to scrapping the article when the coating system becomes damaged.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). The gearbox may be a reduction gearbox (in that the output to the fan is a lower rotational rate than the input from the core shaft). Any type of gearbox may be used.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. The bypass duct may be substantially annular. The bypass duct may be radially outside the engine core. The radially outer surface of the bypass duct may be defined by a nacelle and/or a fan case.

Specific thrust of an engine may be defined as the net thrust of the engine divided by the total mass flow through the engine. At cruise conditions, the specific thrust of an engine described and/or claimed herein may be less than (or on the order of) any of the following: 110 Nkg⁻¹s, 105 Nkg⁻¹s, 100 Nkg⁻¹s, 95 Nkg⁻¹s, 90 Nkg⁻¹s, 85 Nkg⁻¹s or 80 Nkg⁻¹s. The specific thrust may be in an inclusive range bounded by any two of the values in the previous sentence (i.e., the values may form upper or lower bounds), for example in the range of from 80 Nkg⁻¹s to 100 Nkg⁻¹s, or 85 Nkg⁻¹s to 95 Nkg⁻¹s. Such engines may be particularly efficient in comparison with conventional gas turbine engines.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre.

The fan of a gas turbine as described and/or claimed herein may have any desired number of fan blades, for example 14, 16, 18, 20, 22, 24 or 26 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

6

DETAILED DESCRIPTION

Aspects and embodiments of the present disclosure will now be discussed with reference to the accompanying figures. Further aspects and embodiments will be apparent to those skilled in the art.

Figure 1:
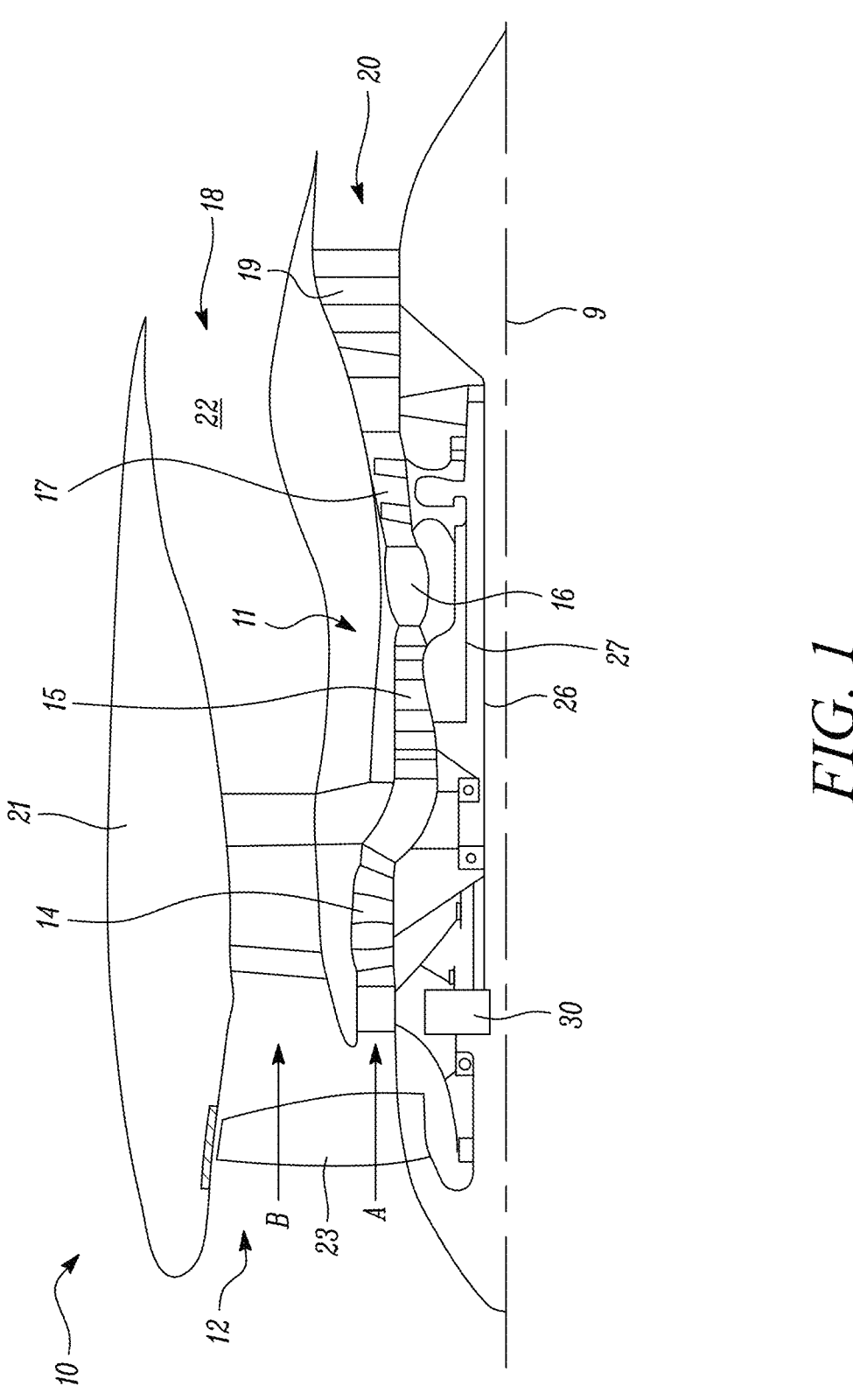
FIG. 1 is a sectional side view of a gas turbine engine.

FIG. 1 illustrates a gas turbine engine 10 having a principal and rotational axis 9. The engine 10 comprises an air intake 12 and a propulsive fan 23 that generates two airflows: a core airflow A and a bypass airflow B. The gas turbine engine 10 comprises an engine core 11 that receives the core airflow A. The engine core 11 comprises, in axial flow series, a low pressure compressor 14, a high pressure compressor 15, combustion equipment 16, a high pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. By way of further example, the gas turbine engine 10 shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial, and circumferential directions are mutually perpendicular.

Figure 2:
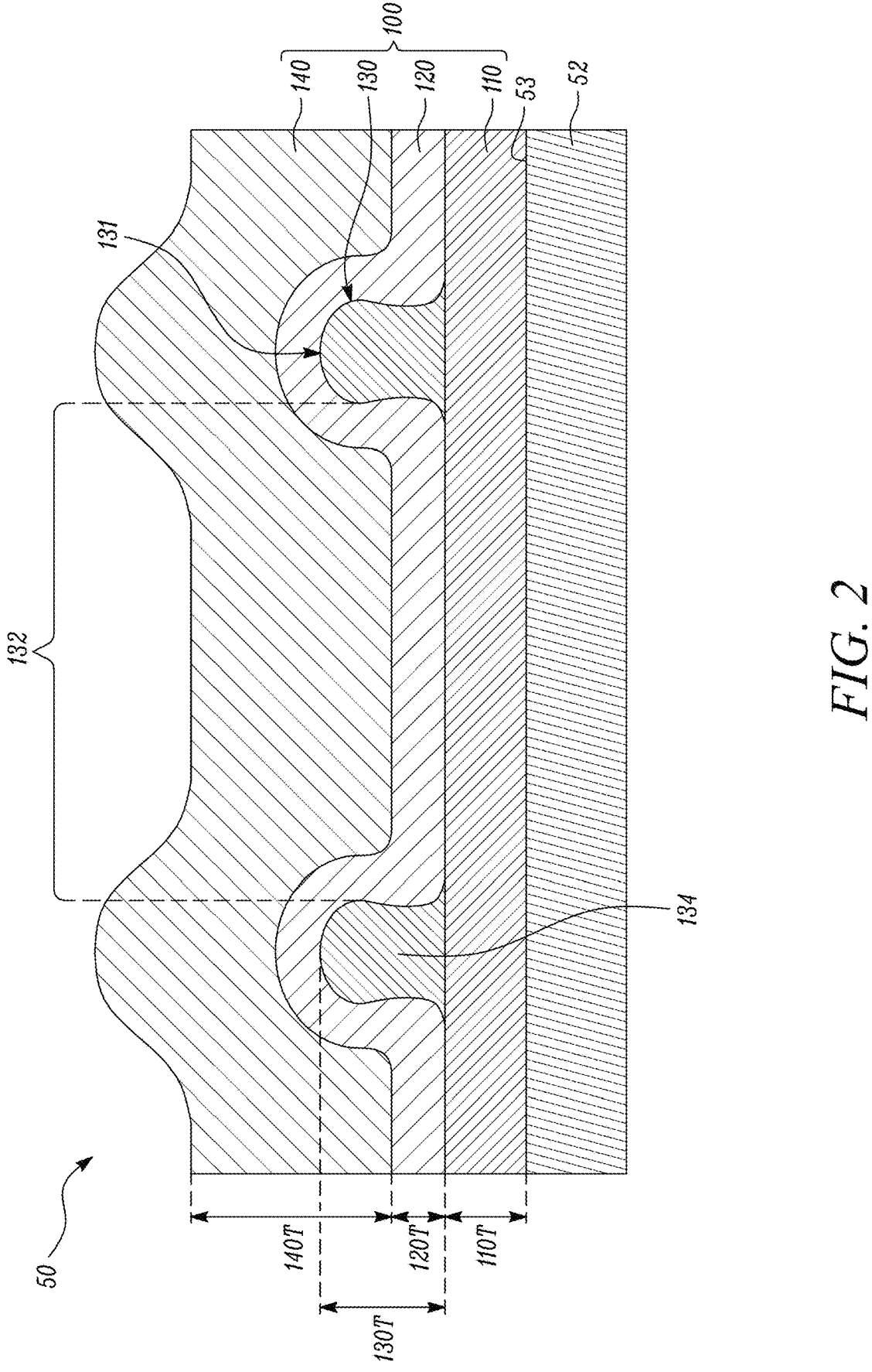
FIG. 2 is a schematic cross-sectional view of a portion of an article including a coating system in accordance with an embodiment of the present disclosure.

FIG. 2 shows a schematic cross-sectional view of a portion of an article 50 in accordance with an embodiment of the present disclosure.

The article 50 may be intended to be used in severe environmental conditions that include, for example, high temperatures and/or corrosive substances. In some examples, the article 50 may be a part of a high-temperature mechanical system. One example of such high-temperature mechanical system includes a gas turbine engine, such as the gas turbine engine 10 of FIG. 1. In some embodiments, the article 50 may include a gas turbine engine component. For example, the article 50 may be a component of the gas turbine engine 10 of FIG. 1. The gas turbine engine component may include a seal segment, a nozzle guide vane (NGV), or any other component of the gas turbine engine 10.

The article 50 includes a substrate 52. The substrate 52 may be a structural body of the article 50. The substrate 52 may therefore be made from any material suitable for providing structural integrity to the article 50. In some embodiments, the substrate 52 may include a metal or a metal alloy. The substrate 52 may include, but is not limited to, nickel-based alloys, iron-nickel-based alloys, cobalt-based alloys, molybdenum-based alloys, and niobium-based alloys.

The article 50 further includes a coating system 100. The coating system 100 may be disposed on the substrate 52. In other words, the substrate 52 may be coated with the coating system 100.

The coating system 100 includes a bond layer 110 disposed on the article 50. Specifically, the bond layer 110 may be disposed on the substrate 52. More specifically, the bond layer 110 may be disposed on an outer surface 53 of the substrate 52. The bond layer 110 includes CoNiCrAlY. As used in the present disclosure, the term "CoNiCrAlY" refers to a multi-phase polycrystalline material. CoNiCrAlY includes cobalt, nickel, chromium, aluminium, and yttrium. "Co" denotes cobalt, "Ni" denotes nickel, "Cr" denotes chromium, "Al" denotes aluminium, and "Y" denotes yttrium. CoNiCrAlY may also include a trace amount of other compounds and impurities.

The bond layer 110 may have a thickness 110T of from 100 microns to 400 microns. In some embodiments, the bond layer 110 may be substantially continuous. In some embodiments, the thickness 110T of the bond layer 110 may vary from 100 microns to 400 microns along the length and/or breadth of the substrate 52.

The bond layer 110 may be deposited using any suitable technique, such as low-pressure plasma spraying (LPPS) (also known as vacuum plasma spraying (VPS)). However, other deposition techniques may be employed to deposit the bond layer 110, and the disclosure is not limited thereto. For example, sputtering flame spray, physical vapour deposition (PVD), high velocity oxyfuel (HVOF) spraying, and the like, may be alternatively employed to deposit the bond layer 110.

The coating system 100 further includes a thermal barrier layer 120. The thermal barrier layer 120 is at least partially disposed on the bond layer 110. The thermal barrier layer 120 includes yttria stabilised zirconia. As used in the present disclosure, the term "Yttria stabilized zirconia" or "YSZ" refers to a ceramic that includes a cubic crystal structure of zirconium dioxide that is stabilized by addition of yttrium oxide.

The thermal barrier layer 120 may have a thickness 120T of from 100 microns to 400 microns. In some embodiments, the thickness 120T of the thermal barrier layer 120 may vary from 100 microns to 400 microns along the length and/or breadth of the substrate 52.

The thermal barrier layer 120 may be deposited using any suitable technique, such as air plasma spraying (APS). However, other deposition techniques may be employed to deposit the thermal barrier layer 120, and the disclosure is not limited thereto. For example, physical vapor deposition (PVD) techniques may be alternatively employed to deposit the thermal barrier layer 120.

Figure 3:
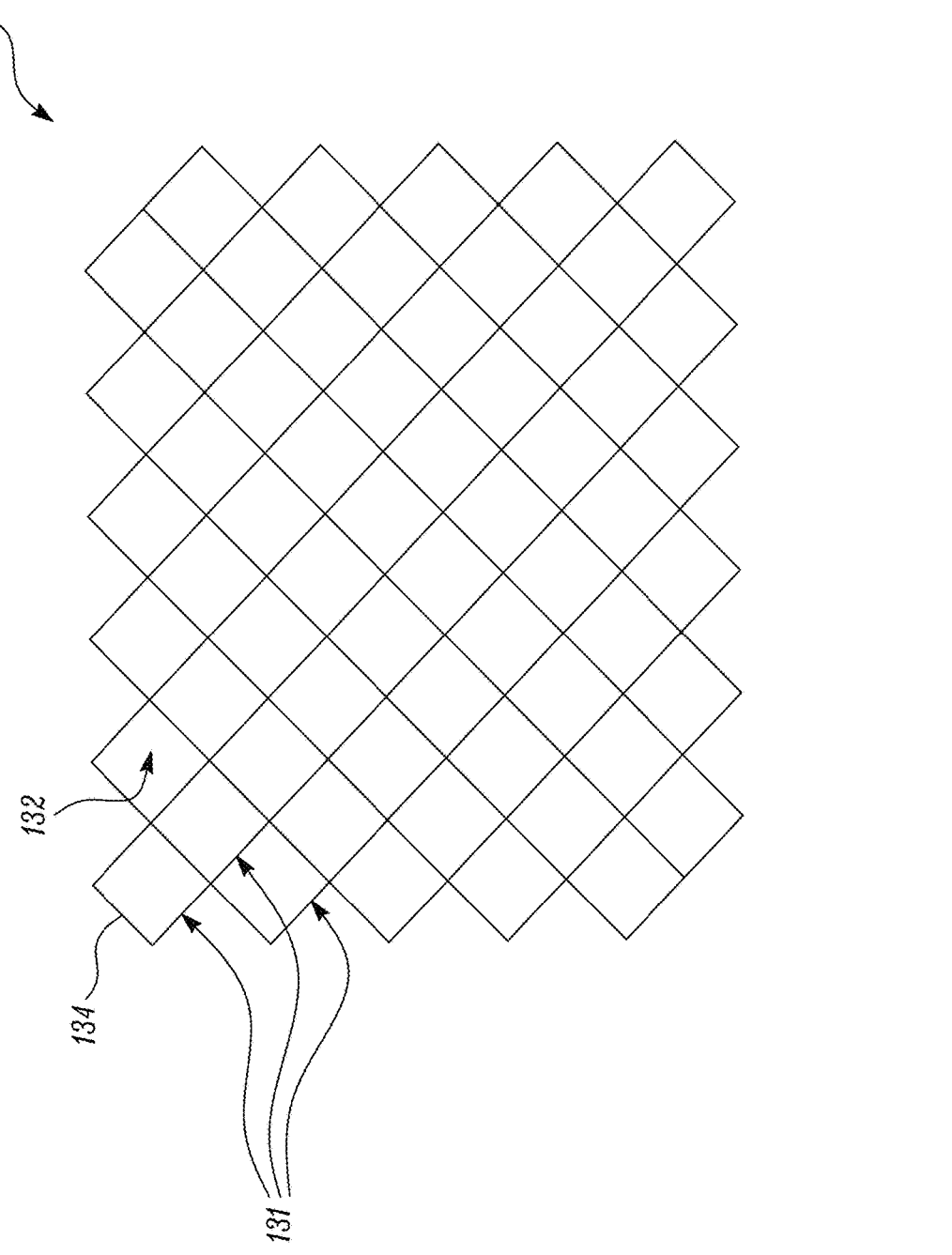
FIG. 3 is a schematic plan view of a portion of a mesh layer of the coating system in accordance with an embodiment of the present disclosure.

The coating system 100 further includes a mesh layer 130. The mesh layer 130 connects the thermal barrier layer 120 to the bond layer 110. The mesh layer 130 is also shown in FIG. 3. The mesh layer 130 includes a plurality of cells 131 (only one shown in FIG. 2) connected to each other. Each cell 131 defines a cell opening 132 therethrough.

The mesh layer 130 extends from the bond layer 110 and is at least partially embedded in the thermal barrier layer 120. More specifically, the cell opening 132 of each of the plurality of cells 131 at least partially receives the thermal barrier layer 120 therein.

Referring to FIGS. 2 and 3, each of the plurality of cells 131 may include a cell wall 134. The cell wall 134 of each of the plurality of cells 131 may define its periphery. The cell wall 134 may further define the cell opening 132. It may be noted that the cell wall 134 may be shared between adjacent cells 131 from the plurality of cells 131. In the illustrated embodiment of FIG. 3, the cell opening 132 of each of the plurality of cells 131 has a rectangular, and more specifically, a square shape. However, it may be noted that the cell opening 132 of each of the plurality of cells 131 may have any suitable shape, such as circular, triangular, polygonal, etc., depending upon the configuration of the cell wall 134, and the disclosure is not limited thereto.

The mesh layer 130 may have a thickness 130T of from 100 microns to 400 microns. The cell wall 134 may define the thickness 130T of the mesh layer 130. In some embodiments, the thickness 130T of the mesh layer 130 may vary from 100 microns to 400 microns along the length and/or breadth of the substrate 52.

The mesh layer 130 includes CoNiCrAlY. In some embodiments, the mesh layer 130 may be a wire mesh. That is, the mesh layer 130 may be a wire mesh made from CoNiCrAlY, with one or more wires defining the cell walls 134 of the plurality of cells 131. In some other embodiments, the mesh layer 130 may be formed by deposition of CoNiCrAlY. In some embodiments, the mesh layer 130 may be formed by direct laser deposition of CoNiCrAlY. However, other suitable deposition techniques may be alternatively employed to form the mesh layer 130, and the disclosure is not limited thereto.

While not illustrated in FIG. 2, in some embodiments, the mesh layer 130 may be further at least partially embedded within the bond layer 110, such that the cell opening 132 further at least partially receives the bond layer 110 therein.

The coating system 100 further includes an abradable layer 140 disposed on the thermal barrier layer 120. The abradable layer 140 includes magnesium spinel. As used in the present disclosure, the term "magnesium spinel" or "MgSpinel" refers to a mineral having the composition (MgAl$_2$O$_4$). The term "magnesium spinel" also includes magnesium-aluminium spinel, for example, having the composition MgAl$_{(2+x)}$O$_{(4+1,5x)}$, where x is a number from 0 to 1.

The abradable layer 140 may have a thickness 140T of from 300 microns to 1000 microns. In some embodiments, the thickness 140T may be from 500 microns to 800 microns. In some embodiments, the thickness 140T of the abradable layer 140 may vary from 300 microns to 1000 microns along the length and/or breadth of the substrate 52.

The abradable layer 140 may be deposited using any suitable technique, such as air plasma spraying (APS). However, other deposition techniques may be employed to deposit the abradable layer 140, and the disclosure is not limited thereto. For example, suspension plasma spraying, physical vapour deposition (PVD), cathodic arc deposition, slurry deposition, and the like may be alternatively employed to deposit the abradable layer 140.

The coating system 100 may protect the substrate 52 from severe environmental conditions that include, for example, high temperatures and/or corrosive substances, and allow the article 50 to operate in the severe environmental conditions.

Specifically, the bond layer 110 may reduce or prevent formation of an oxide layer on the substrate 52. As a result, the bond layer 110 may reduce or prevent sheet spallation of the thermal barrier layer 120. Moreover, the bond layer 110 may allow creep relaxation at high temperatures. In other words, the bond layer 110 may enhance the degree of compliance between the substrate 52 and the thermal barrier layer 120, thereby reducing the risk of a strain-based failure of the coating system 100.

As discussed above, the mesh layer 130 connects the thermal barrier layer 120 to the bond layer 110. The mesh layer 130 may function as an adhesion promoter layer between the bond layer 110 and the thermal barrier layer 120. Specifically, the mesh layer 130 may provide a "mechanical key" between the bond layer 110 and the thermal barrier layer 120, and thus may increase robustness of the coating system 100 to strain-based failures.

Moreover, the mesh layer 130 may cause the thermal barrier layer 120 and the abradable layer 140 to crack in a localised manner. That is, local sections of the thermal barrier layer 120 and the abradable layer 140 may crack without significantly affecting adjacent local sections. The local sections may correspond to the mesh layer 130, and specifically to a shape of the cell openings 132 of the plurality of cells 131. Cracking of the thermal barrier layer 120 and the abradable layer 140 in such localised manner may reduce the risk of sheet strain-based failure of the coating system 100. Consequently, the abradable layer 140 may abrade or break in a controlled manner when exposed to mechanical forces of sufficient force. The abradable layer 140 may also thermally protect the substrate 52.

The thermal barrier layer 120 typically has a coefficient of thermal expansion between that of the abradable layer 140, which is typically quite low, and the metallic layers (i.e., the bond layer 110 and the mesh layer 130), which is typically quite high. The thermal barrier layer 120 may effectively create an inter-stage between the abradable layer 140 and the metallic layers, thereby reducing relative thermal growths between them, and thus may reduce relative strain-based failures. The thermal barrier layer 120 may also assist in keeping the bond layer 110, the mesh layer 130, and the abradable layer 140 secured together.

The abradable layer 140 and the thermal barrier layer 120 are at least partially removable from the mesh layer 130 and the bond layer 110 without damaging the mesh layer 130 and the bond layer 110. In some embodiments, the abradable layer 140 and the thermal barrier layer 120 may be at least partially removable from the mesh layer 130 and the bond layer 110 by water jet stripping. For example, a water jet device (not shown in FIG. 2) may be employed to at least partially remove the abradable layer 140 and the thermal barrier layer 120 from the mesh layer 130 and the bond layer 110. The water jet device may be operated with certain parameters for optimal removal of the abradable layer 140 and the thermal barrier layer 120. Such parameters will be discussed later with reference to FIG. 5.

The abradable layer 140 and the thermal barrier layer 120 being least partially removable from the mesh layer 130 and the bond layer 110 without damaging the mesh layer 130 and the bond layer 110 may enable repairment of the coating system 100. Specifically, the abradable layer 140 and the thermal barrier layer 120 may be replaced with a new abradable layer and a new thermal barrier layer, respectively, to repair the coating system 100. As a result, the article 50 may become fit for use after repairment and thus may be reused.

Figures 4A, 4B:
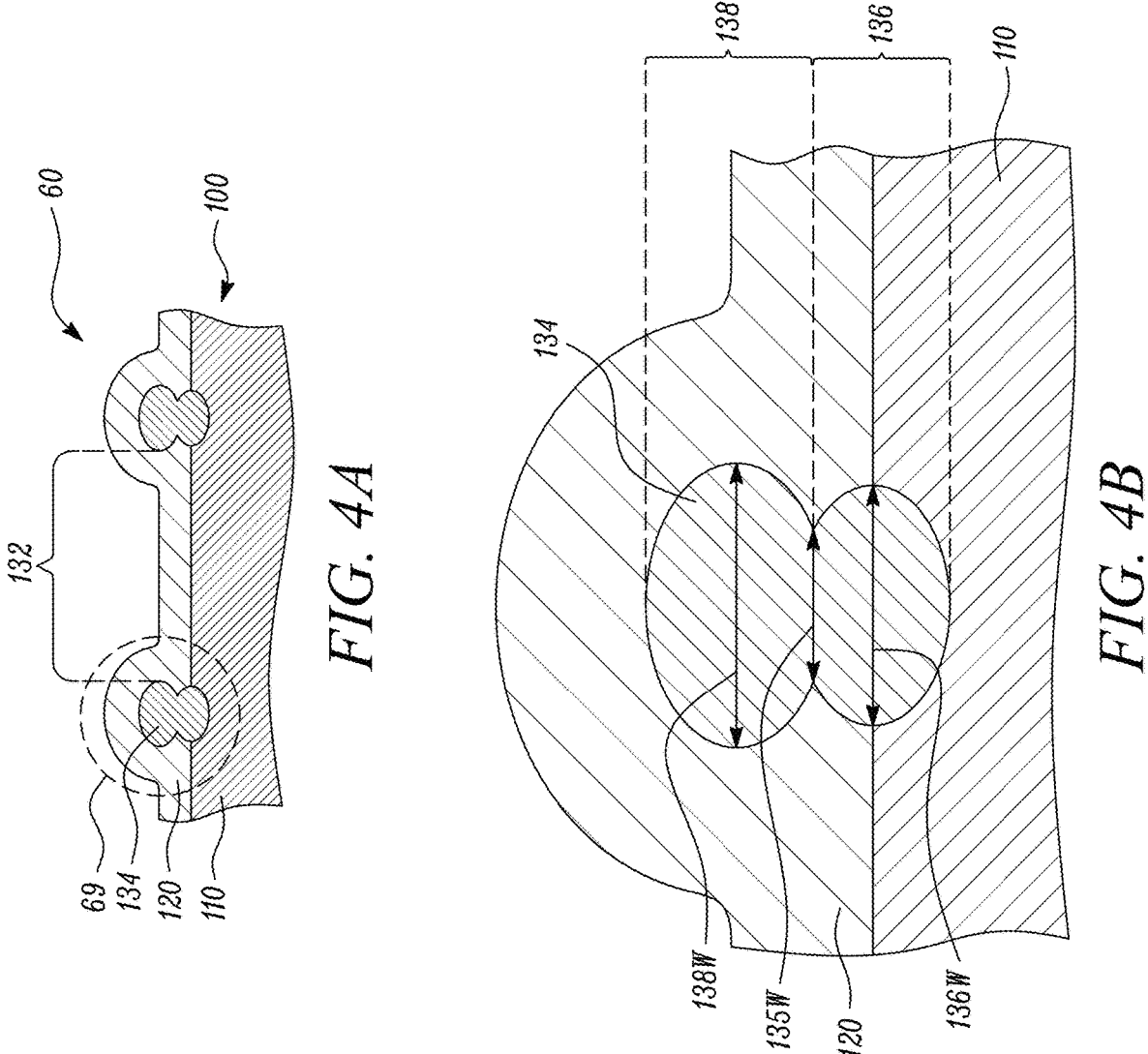
FIG. 4A is a schematic cross-sectional view of a portion of an article in accordance with another embodiment of the present disclosure with some elements of the coating system not shown.
FIG. 4B is a schematic zoomed-in view of a portion of the article of FIG. 4A in accordance with an embodiment of the present disclosure.

FIG. 4A shows a schematic cross-sectional view of a portion of an article 60 in accordance with another embodiment of the present disclosure. The article 60 is similar to the article 50 of FIG. 2, with like elements designated by like reference characters. However, the article 60 has a different configuration of the coating system 100 as compared to the article 50 of FIG. 2. Specifically, the coating system 100 of the article 60 has a different configuration of the mesh layer 130 than that of FIG. 2. Some elements of the coating system 100 and the article 60 are not shown in FIG. 4A for illustrative purposes.

FIG. 4B shows a schematic zoomed-in view of a portion 69 of the article 60 in accordance with an embodiment of the present disclosure.

Referring to FIGS. 4A and 4B, in some embodiments, the cell wall 134 may include a first portion 136 that is at least partially embedded within the bond layer 110. In some embodiments, as shown in FIG. 4B, the first portion 136 may further be at least partially embedded in the thermal barrier layer 120. The first portion 136 may have a first maximum width 136W.

The cell wall 134 may further include a second portion 138 that extends from the first portion 136 opposite to the bond layer 110. The second portion 138 may be at least partially embedded in the thermal barrier layer 120. The second portion 138 may have a second maximum width 138W. The second maximum width 138W may be greater than the first maximum width 136W. In some embodiments, the second maximum width 138W may be greater than the first maximum width 136W by a factor of from 1.1 to 1.5.

In some embodiments, the cell wall 134 may have a minimum width 135W between the first portion 136 and the second portion 138. Moreover, as shown in FIG. 4B, in some embodiments, each of the first portion 136 and the second portion 138 may have an oval cross-sectional shape.

The shape and dimensional configuration of the cell wall 134, as shown in FIGS. 4A and 4B, may improve the connection between the bond layer 110 and the thermal barrier layer 120.

Figure 5:
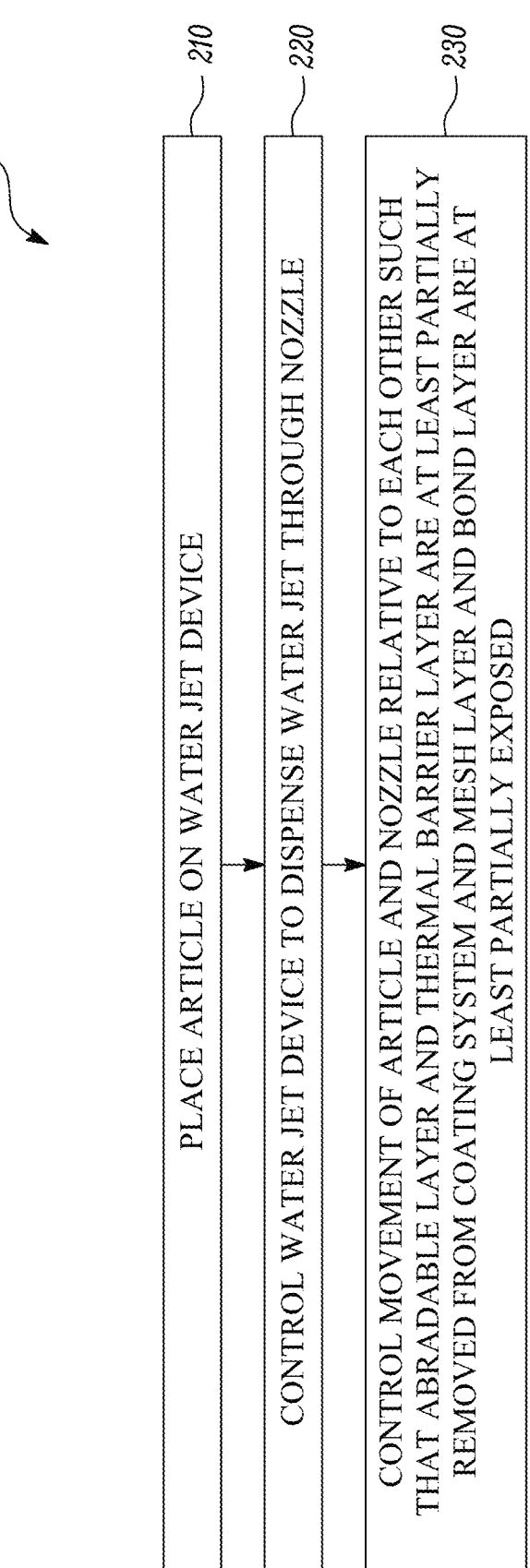
FIG. 5 is a flowchart depicting various steps of a method for maintaining the coating system on an article in accordance with an embodiment of the present disclosure.
Figure 6:
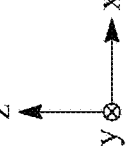
FIG. 6 is a schematic diagram of a water jet device for performing the method of FIG. 5 in accordance with an embodiment of the present disclosure.

FIG. 5 shows a flowchart depicting various steps of a method 200 for maintaining the coating system 100 on an article (e.g., the article 50 of FIG. 2 or the article 60 of FIG. 4A) in accordance with an embodiment of the present disclosure. The method 200 uses a water jet device (e.g., a water jet device 300 shown in FIG. 6) that includes a nozzle configured to dispense a water jet therefrom. The water jet device 300 includes a nozzle 310 configured to dispense a water jet 320 therefrom. FIG. 6 also shows x, y, and z axes. The method 200 will be described with additional reference to the water jet device 300 of FIG. 6. The coating system 100 is shown schematically in FIG. 6 with some details omitted for illustrative purposes.

At step 210, the method 200 includes placing the article on the water jet device, such that the coating system 100 faces the nozzle. It may be noted that placing the article on the water jet device includes mounting, clamping, fastening, etc., of the article on the water jet device. The water jet device may include means for allowing rotational and/or translation motion of the article with respect to the nozzle. Referring to FIG. 6, the method 200 may include placing the article 50 on a table (not shown) of the water jet device 300. The table may provide rotational and/or translation motion to the article 50.

At step 220, the method 200 further includes controlling the water jet device to dispense the water jet through the nozzle, such that the water jet strikes the coating system 100. The water jet has a pressure from 276 Megapascals (MPa) to 345 MPa. For example, referring to FIG. 6, the method 200 may include controlling the water jet device 300 to dispense the water jet 320 through the nozzle 310, such that the water jet 320 strikes the coating system 100. More specifically, the water jet 320 may strike at least the abradable layer 140 and the thermal barrier layer 120.

At step 230, the method 200 further includes controlling a movement of the article and the nozzle relative to each other, such that the abradable layer 140 and the thermal barrier layer 120 of the coating system 100 are at least partially removed from the coating system 100, and the mesh layer 130 and the bond layer 110 are at least partially exposed. Referring to FIG. 6, for example, the method 200 may include controlling a movement of the article 50 and the nozzle 310 relative to each other, such that the abradable layer 140 and the thermal barrier layer 120 of the coating system 100 are at least partially removed from the coating system 100, and the mesh layer 130 and the bond layer 110 are at least partially exposed.

Figure 7B:
FIG. 7B is a photograph showing a plan view of the article of FIG. 7A after undergoing the method of FIG. 5 in accordance with an embodiment of the present disclosure.
Figure 7B:
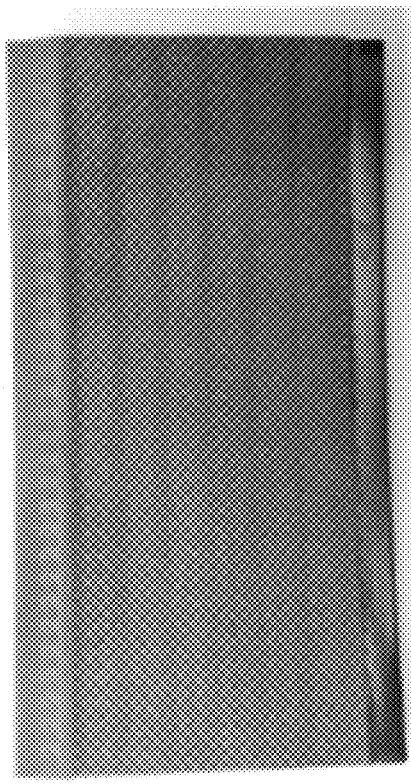
Figure 7A:
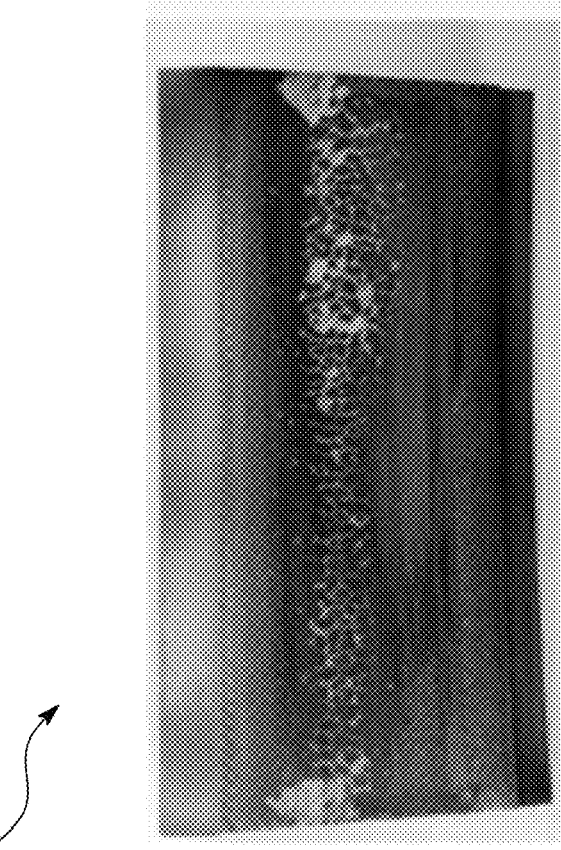
FIG. 7A is a photograph showing a plan view of an article with a worn off coating system in accordance with an embodiment of the present disclosure.

FIG. 7A shows a photograph of the article 50 with damaged or worn off thermal barrier layer 120 and abradable layer 140 (see FIG. 2 for reference). The method 200 may be employed to remove the damaged or worn off thermal barrier layer 120 and abradable layer 140 of the coating system 100.

FIG. 7B shows a photograph of the article 50 after undergoing step 230 of the method 200. As shown in FIG. 7B, the mesh layer 130 and the bond layer 110 (see FIG. 2 for reference) are at least partially exposed.

In some embodiments, controlling the movement of the article and the nozzle relative to each other includes moving the article relative to the nozzle at a surface speed of from 13 millimetres per second (mm/s) to 70 mm/s. Referring to FIG. 6, for example, the article 50 may be moved relative to the nozzle 310 at the surface speed of from 13 mm/s to 70 mm/s substantially along the x-axis and/or the y-axis.

In some embodiments, controlling the movement of the article and the nozzle relative to each other further includes moving the nozzle normally to the article at a traverse speed of from 0.04 mm/s to 0.22 mm/s. Referring to FIG. 6, for example, the nozzle 310 may be moved relative to the article 50 at the traverse speed of from 0.04 mm/s to 0.22 mm/s substantially along the z-axis.

In some embodiments, the nozzle may extend along a nozzle axis. Further, an angle between the nozzle axis and the coating system 100 may be from 15 degrees to 45 degrees. Referring to FIG. 6, the nozzle 310 may extend along a nozzle axis 311. An angle α between the nozzle axis 311 and the coating system 100 may be from 15 degrees to 45 degrees.

In some embodiments, the nozzle may be a fan jet nozzle. Referring to FIG. 6, for example, the nozzle 310 may be a fan jet nozzle.

In some embodiments, the nozzle may have a rotational speed of 1000 rotations per minute (RPM). The nozzle may rotate about the nozzle axis. Referring to FIG. 6, for example, the nozzle 310 may have a rotational speed of 1000 RPM about the nozzle axis 311.

In some embodiments, the nozzle may have an orifice that has a width of 0.5 millimetres. For example, the nozzle 310 may have an orifice 312 that has a width 312W of 0.5 millimetres. The width 312W may be a maximum width of the orifice 312. In some embodiments, the width 312W may correspond to a diameter of the orifice 312.

In some embodiments, a stand-off distance defined between the orifice of the nozzle and the article may be from 15 mm to 25 mm. Referring to FIG. 6, for example, a stand-off distance 305 defined between the orifice 312 of the nozzle 310 and the article 50 may be from 15 mm to 25 mm.

In some embodiments, the method 200 may further include completing two to four passes of the nozzle across the article. For example, the method 200 may include completing two to four passes of the nozzle 310 across the article 50. This may ensure that the thermal barrier layer 120 and the abradable layer 140 are properly removed from the coating system 100.

In some embodiments, the water jet device 300 may be operated using closed-loop process control. Alternatively, the water jet device 300 may be manually operated. The aforementioned parameters may be suitable for at least partially removing the abradable layer 140 and the thermal barrier layer 120 from the mesh layer 130 and the bond layer 110, without damaging the mesh layer 130 and the bond layer 110, by using a water jet device.

Figure 8A:
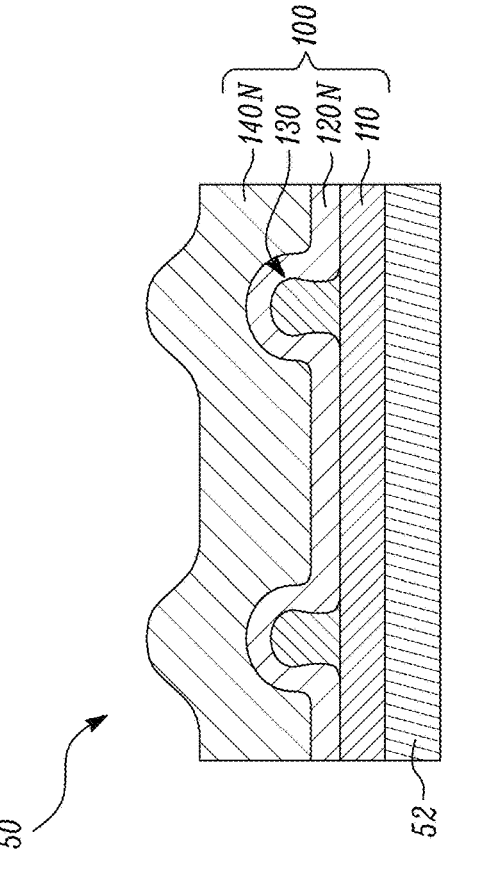
FIG. 8A is a schematic cross-sectional view of an article after undergoing the method of FIG. 5 in accordance with an embodiment of the present disclosure.

FIG. 8A shows a schematic cross-sectional view of the article 50 after undergoing step 230 of the method 200 of FIG. 5.

Figure 8B:
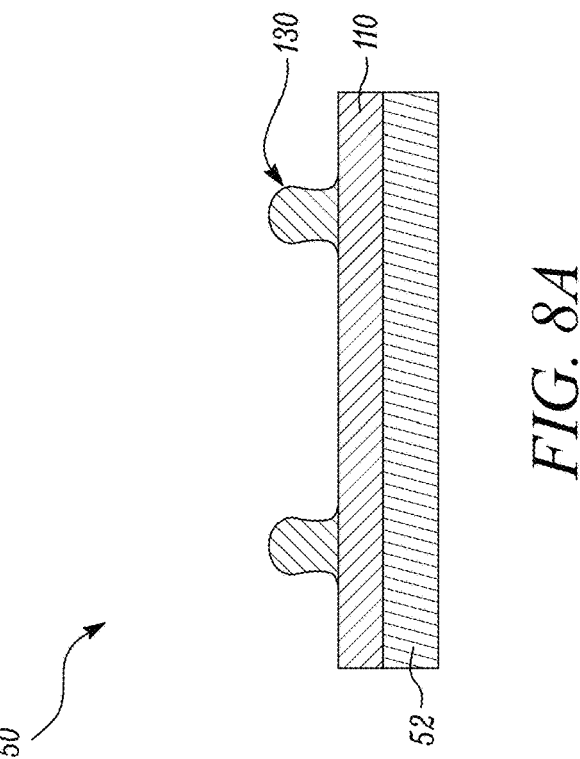
FIG. 8B is a schematic cross-sectional view of the article of FIG. 8A after undergoing further steps of the method of FIG. 5 in accordance with an embodiment of the present disclosure.

FIG. 8B shows a schematic cross-sectional view of the article 50 that is further maintained using the method 200.

As shown in FIG. 8A, after performance of step 230 on the article 50, the mesh layer 130 and the bond layer 110 may be at least partially exposed. Referring to FIGS. 5, 6, 8A, and 8B, in some embodiments, the method 200 may further include providing a new thermal barrier layer on the exposed mesh layer and the bond layer. The method 200 may further include providing a new abradable layer on the new thermal barrier layer. For example, as shown in FIG. 8B, the method 200 may further include providing a new thermal barrier layer 120N on the exposed mesh layer 130 and the bond layer 110. The method 200 may further include providing a new abradable layer 140N on the new thermal barrier layer 120N. The new thermal barrier layer 120N may be substantially similar to the thermal barrier layer 120 described above with reference to FIG. 2. The new abradable layer 140N may be substantially similar to the abradable layer 140 described above with reference to FIG. 2.

Providing the new thermal barrier layer 120N and the new abradable layer 140N may effectively repair the coating system 100, such that the article 50 becomes fit for use. The method 200 may therefore allow repairment of the coating system 100, which may be economical as compared to scrapping the article 50 when the coating system 100 becomes damaged.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A coating system for an article, the coating system comprising:

a bond layer disposed on the article and comprising CoNiCrAlY;

a thermal barrier layer at least partially disposed on the bond layer, the thermal barrier layer comprising yttria stabilised zirconia;

a wire mesh layer connecting the thermal barrier layer to the bond layer, the wire mesh layer comprising CoNiCrAlY, wherein the wire mesh layer comprises a plurality of cells connected to each other, wherein the wire mesh layer extends from the bond layer and is at least partially embedded in the thermal barrier layer, wherein each cell of the plurality of cells defines a cell opening therethrough, and wherein the cell opening of each cell of the plurality of cells at least partially receives the thermal barrier layer therein, wherein each cell of the plurality of cells comprises a cell wall, the cell wall comprising:

a first portion that is at least partially embedded within the bond layer, the first portion having a first maximum width; and a second portion that extends from the first portion opposite to the bond layer and is at least partially embedded in the thermal barrier layer, the second portion having a second maximum width, wherein the second maximum width is greater than the first maximum width; and an abradable layer disposed on the thermal barrier layer and comprising magnesium spinel;

wherein the abradable layer and the thermal barrier layer are at least partially removable from the wire mesh layer and the bond layer without damaging the wire mesh layer and the bond layer.

2. The coating system of claim 1, wherein the bond layer has a thickness of from 100 microns to 400 microns.

3. The coating system of claim 1, wherein the wire mesh layer has a thickness of from 100 microns to 400 microns.

4. The coating system of claim 1, wherein the thermal barrier layer has a thickness of from 100 microns to 400 microns.

5. The coating system of claim 1, wherein the abradable layer has a thickness of from 300 microns to 1000 microns.

6. The coating system of claim 5, wherein the abradable layer has a thickness of from 500 microns to 800 microns.

7. The coating system of claim 1, wherein the abradable layer and the thermal barrier layer are at least partially removable from the wire mesh layer and the bond layer by water jet stripping.

8. The coating system of claim 1, wherein each of the first portion and the second portion has an oval cross-sectional shape.

9. The coating system of claim 1, wherein the cell wall has a minimum width between the first portion and the second portion.

10. The coating system of claim 1, wherein the cell opening of each cell of the plurality of cells further at least partially receives the bond layer therein.

11. The coating system of claim 1, wherein the second maximum width is greater than the first maximum width by a factor of from 1.1 to 1.5.

12. The coating system of claim 1, wherein the cell opening of each of the plurality of cells has a rectangular shape.

13. The coating system of claim 12, wherein the cell opening of each of the plurality of cells has a square shape.

14. The article comprising:

a substrate; and the coating system of claim 1.

15. The article of claim 14, wherein the article is a gas turbine engine component.

* * * * *